(12) United States Patent
Sedarat et al.

(10) Patent No.: US 11,695,504 B1
(45) Date of Patent: Jul. 4, 2023

(54) FORWARD ERROR CORRECTION DECODER FAILURE DETECTION

(71) Applicant: Ethernovia Inc., San Jose, CA (US)

(72) Inventors: Hossein Sedarat, San Jose, CA (US);
Ramin Shirani, Morgan Hill, CA (US);
Darren S. Engelkemier, Menlo Park,
CA (US); Oscar Ballan, San Francisco,
CA (US); Roy T. Myers, Jr., Morgan
City, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 17/450,344

(22) Filed: Oct. 8, 2021

Related U.S. Application Data

(60) Provisional application No. 63/089,880, filed on Oct. 9, 2020.

(51) Int. Cl.
*H04L 1/00* (2006.01)
(52) U.S. Cl.
CPC .......... *H04L 1/0047* (2013.01); *H04L 1/0061* (2013.01); *H04L 1/0067* (2013.01)

(58) Field of Classification Search
CPC .... H04L 1/0047; H04L 1/0061; H04L 1/0067
See application file for complete search history.

(56) References Cited

U.S. PATENT DOCUMENTS

| | | | |
|---|---|---|---|
| 2005/0022101 A1* | 1/2005 | Malm | H04L 1/0055 714/801 |
| 2019/0051370 A1* | 2/2019 | Azam | G11C 29/36 |
| 2020/0350927 A1* | 11/2020 | Jang | H03M 13/114 |

* cited by examiner

*Primary Examiner* — Thien Nguyen
(74) *Attorney, Agent, or Firm* — Schwegman Lundberg & Woessner, P.A.

(57) ABSTRACT

Various embodiments described herein provide for a mechanism for detecting failure in the operation of FEC of a physical layer device, such as a physical layer device of a networking application that seeks to meet a functional safety standard (e.g., ISO 26262). In particular, some embodiments described herein provide one of several methods for detecting a failure in the operation of a FEC decoder of a physical layer device.

18 Claims, 12 Drawing Sheets

FORWARD ERROR CORRECTION DECODER FAILURE DETECTION

CROSS-REFERENCE TO RELATED APPLICATION

This application claims priority to and the benefit of U.S. Provisional Patent Application No. 63/089,880, filed on Oct. 9, 2020, which is incorporated herein by reference.

TECHNICAL FIELD

Embodiments described herein relate to data communications and, more particularly, to systems, methods, devices, and instructions for detection failure of a forward error correction (FEC) decoder in a communication system.

BACKGROUND

Network-based communication, such as that based on Ethernet physical layer standards, often use error correction mechanisms when communicating data packets or data frames from one physical layer (PHY) device to another. Forward error correction (FEC) is one of those mechanisms and can be used within a physical layer device (of a communication system) to identify and correct errors in hardware components of the physical layer device. Additionally, error correction mechanisms like FEC can enable a physical layer device (e.g., in a communications receiver) used in applications (e.g., automotive electronics) to meet requirements of various functional safety standards. For instance, one requirement of ISO 26262, which is an international standard for functional safety of electrical and electronic systems within road vehicles, is a means to detect and correct for errors due to hardware failures. Use of FEC and other methods of hardware detection failure (e.g., parity check, and CRC and hash for memory hardware) can aid in meeting such a functional safety requirement.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
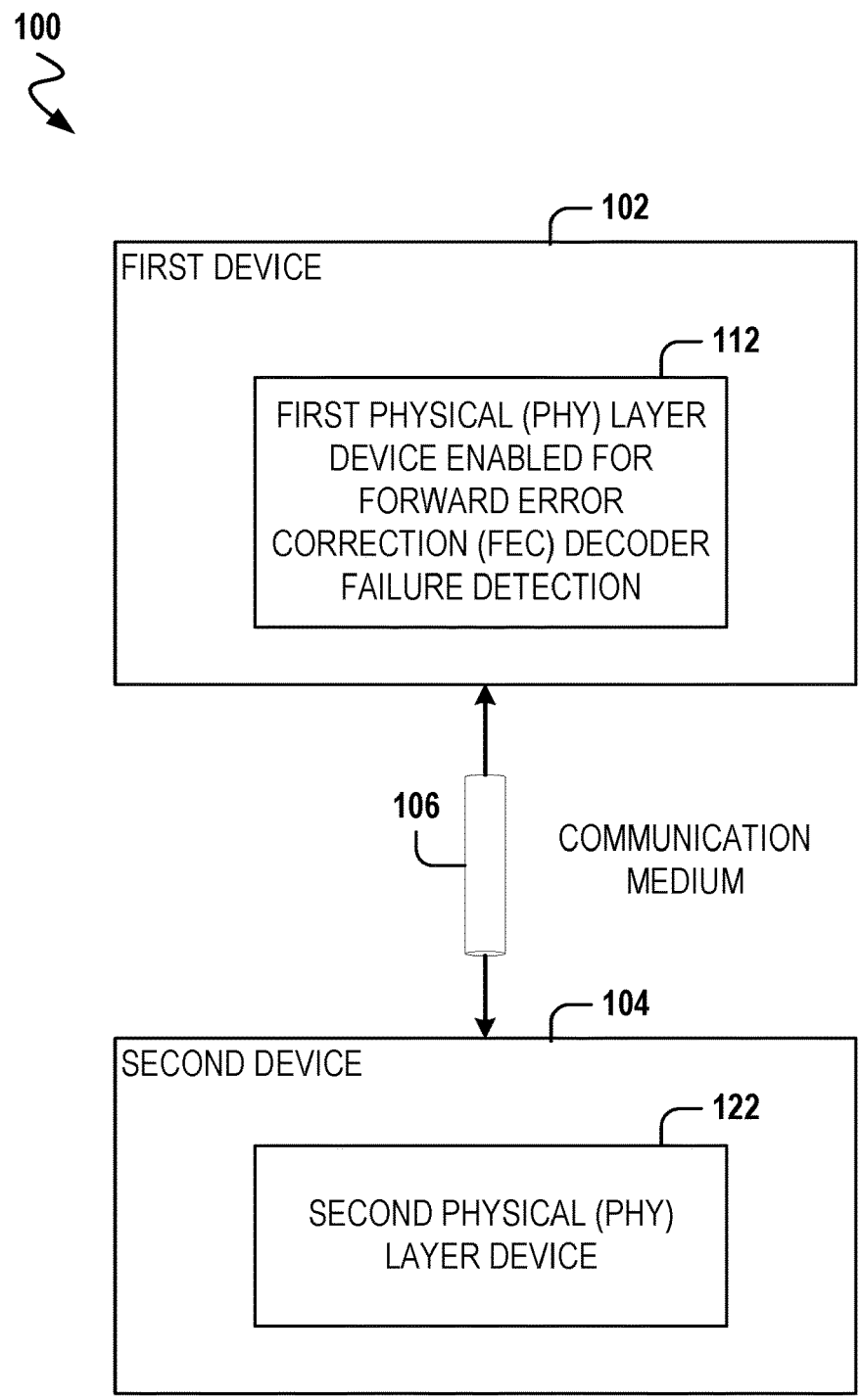
FIG. 1 is a block diagram illustrating an example system that comprises a physical (PHY) layer devices, either of which can use of a mechanism for detecting failure in the operation of a forward error correction (FEC) decoder, in accordance with some embodiments.

Forward error correction (FEC) is a common error detection and correction component of a physical layer (e.g., physical layer device) of a communications network. As noted, FEC can be used to meeting target requirements of certain functional safety standards, such as those of ISO 26262. Within a physical layer, a FEC component can provide strong detection and correction capability of errors in a received signal (e.g., received from physical layer device). For instance, a received physical layer can use a FEC to detect errors not only due to noise within a channel between two physical layer device, but also due to potential hardware failures in the data path. Generally, FEC is implemented by a relatively complex logic block that comprises several internal components. Though chances of the failure of a FEC component (e.g., in a physical layer) are small, the chances are not negligible either. In some instances, a failure in FEC of a physical layer (e.g., of a physical layer device) can result in a breakdown of failure detection/correction for the rest of the physical layer. In fact, the FEC of a physical layer can be one of the weakest links in the undetected/ uncorrected failure rate of the physical layer.

Various embodiments described herein provide for a mechanism for detecting failure in the operation of FEC of a physical layer device, such as a physical layer device of a networking application that seeks to meet a functional safety standard (e.g., ISO 26262). In particular, some embodiments described herein provide one of several methods for detecting a failure in the operation of a FEC decoder of a physical layer device.

According to some embodiments, a failed FEC decoder in a physical layer device is detected through use of redundant FEC decoders. For instance, a physical layer device can comprise a first FEC decoder and a second (redundant) FEC decoder that runs at the same speed and operates on incoming (received data) in parallel with the first FEC decoder. The second FEC decoder can detect a failure in operation of the first FEC decoder in response to a mismatch in the output of the two FEC decoders. An example of this methodology of detecting failure of a FEC decoder (in a physical layer device) is illustrated and described with respect to FIG. 3.

According to some embodiments, a failed FEC decoder in a physical layer device is detected through use of a redundant FEC decoder that is periodically run in parallel to check whether a main FEC decoder is behaving in identical manner as the redundant FEC decoder. For instance, a physical layer device can comprise a first FEC decoder and a second (redundant) FEC decoder that runs at a slower speed than the first FEC decoder and operates on only a subset of data (e.g., data frames) received by the physical layer device but not all data (e.g., data frames). In particular, input and output data (e.g., data frames) of the main FEC decoder can be captured and fed to the redundant FEC decoder for comparison (e.g., captured and fed periodically). The second FEC decoder can generate the output data based on the fed input data, this output data can be compared against the output data generated by the first FEC decoder for the fed input data, and a failure in operation of the first FEC decoder can be detected in response to a mismatch in the output of the two FEC decoders. With the second FEC decoder operating on a subset of data (e.g., data frame), it can be configured to operate at a slower rate than the first FEC decoder, which can not only consume less power than the first FEC decoder but also have a smaller footprint when implemented (e.g., takes smaller area on silicon). Depending on the embodiment, with the second FEC decoder operating at a slower speed than the first FEC decoder, the second FEC decoder can be implemented as a dedicated hardware component or as a software process operating on a processor (e.g., processor of the physical layer device). An example of this methodology of detecting failure of a FEC decoder (in a physical layer device) is illustrated and described with respect to FIG. 4.

According to some embodiments, a failed FEC decoder in a physical layer device is detected by checking the health of the FEC decoder of the physical layer device when it can be taken off the data path. In particular, the FEC decoder can be taken off the data path when incoming data (e.g., incoming data frames) is known in advance to not carry useful information (e.g., during idle data frames). Generally, during that time, one or more idle data frames can be injected downstream into the FEC decoder. For some embodiments, when the FEC decoder is taken off the data path, one or more known data frames can be injected into the FEC decoder and the output of the FEC decoder can be checked against one or more expected values to ensure correct operation of the FEC decoder. Whether incoming data carries useful information can vary between different network applications. For instance, in an automotive network application, incoming data comprising useful information can include data frames that carry data from camera when a vehicle is operating and moving, while incoming data comprising non-useful information can include data frames that carry data from camera the vehicle that just started, while the vehicle is parked, or while the vehicle is stopped an intersection during a red light. An example of this methodology of detecting failure of a FEC decoder (in a physical layer device) is illustrated and described with respect to FIG. 5.

According to some embodiments, a failed FEC decoder in a first physical layer device is detected by causing a second physical layer device to send to the first physical layer device data (e.g., one or more data frames) that is intentionally injected with one or more errors, and by determining whether the first physical layer device is able to correct the data received from the second physical layer device. This method of FEC decoder failure detection can involve the first and second physical layer devices coordinating together to inject the one or more errors into designated data (e.g., one or more designated data frames). For some embodiments, FEC decoder failure detection comprises: the second physical layer (e.g., transmitting link-partner) making planned alterations in one or more data words in one or more designated data frames (e.g., FEC frames) after the parity words are calculated and inserted into the one or more designated data frame; the first physical layer device (e.g., receiving partner) decoding the one or more designated data frames and identifying, within the one or more designated data frames, the one or more data words having errors; and determining that the operation of the FEC decoder of the first physical layer device is valid in response to determining that the one or more identified data words include the planned alterations and to determining that the corrected values for those one or more identified data words match their corresponding planned (e.g., expected) values. This method relies on coordination between the first and second physical layer devices, which can serve as link partners. An example of this methodology of detecting failure of a FEC decoder (in a physical layer device) is illustrated and described with respect to FIG. 6.

By using various embodiments, physical layers for networking applications, such as automotive networking applications and the like, can implement a FEC mechanism that not only detect and correct failures within the physical layer, but can also detect for failures in the FEC mechanism itself. Various embodiments described herein provide different technical solutions for detecting a FEC decoder in a physical layer device, which can enable a network application (that includes the physical layer device) to meet a functional safety standard. Additionally, some embodiments can use more than two methods described herein to detect a failure of a FEC decoder in a physical layer device.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 that comprises a first physical (PHY) layer device 112 and a second physical (PHY) layer device 122, either of which can use of a mechanism for detecting failure in the operation of a forward error correction (FEC) decoder, in accordance with some embodiments. As shown, the first physical layer device 112 is part of a first device 102, and the second physical layer device 122 is part of a second device 104. The first physical layer device 112 represents one or more components of the first device 102 that implement or enable a PHY layer of a network stack of the first device 102, while the second physical layer device 122 represents one or more components of the second device 104 that implement or enable a PHY layer of a network stack of the second device 104. A communication medium 106 operatively couples the first device 102 to the second device 104, where the communication medium 106 can support a data link between the first device 102 and the second device 104. The communication medium 106 can comprise a wire (e.g., twisted pair) that permits transmission of an analog signal. Depending on the embodiment, the first device 102 can be implemented (at least in part) by machine 1200 of FIG. 12, and the second device 104 can be implemented (at least in part) by machine 1200 of FIG. 12. As shown, the first physical layer device 112 is enabled for failure detection of a forward error correction (FEC) decoder of the first physical layer device 112 in accordance with various embodiments. Depending on the embodiment, the first physical layer device 112 can implement one or more of the methods for detecting failure of a FEC decoder described herein. Additionally, for some embodiments, the second physical layer device 122 can implement features or methodologies described herein that enable the first physical layer device 112 to detect failure of a FEC decoder of the first physical layer device 112.

Though not illustrated, in certain applications, the first device 102 can be communicatively coupled to one or more other devices (e.g., one or more sensor devices) that generate or otherwise provide the first device 102 with data (e.g., data packets or data frames) that need to be transmitted to the second device 104. Accordingly, via the second physical layer device 122, the second device 122 can transmit the data received from the one or more other devices to the first device 102 (e.g., using a high data rate, such as one based on IEEE 1202.11ch). Depending on the embodiment, the one or more devices can comprise one or more sensors or other peripheral devices that generate or provide video data or radar/lidar data according to a data standard. The first physical layer device 112 of the first device 102 can receive the data from the second device 104. Subsequently, the data received at the first device 102 can be processed by a processor that is part of, or operatively coupled to, the first device 102. For example, the received data can comprise video data from a camera sensor device that can be processed at the first device 102. The processor of the first device 102 can include, without limitation, an electronic control unit (ECU), a central processing unit (CPU), or a graphic processing units (GPU).

Figure 2:
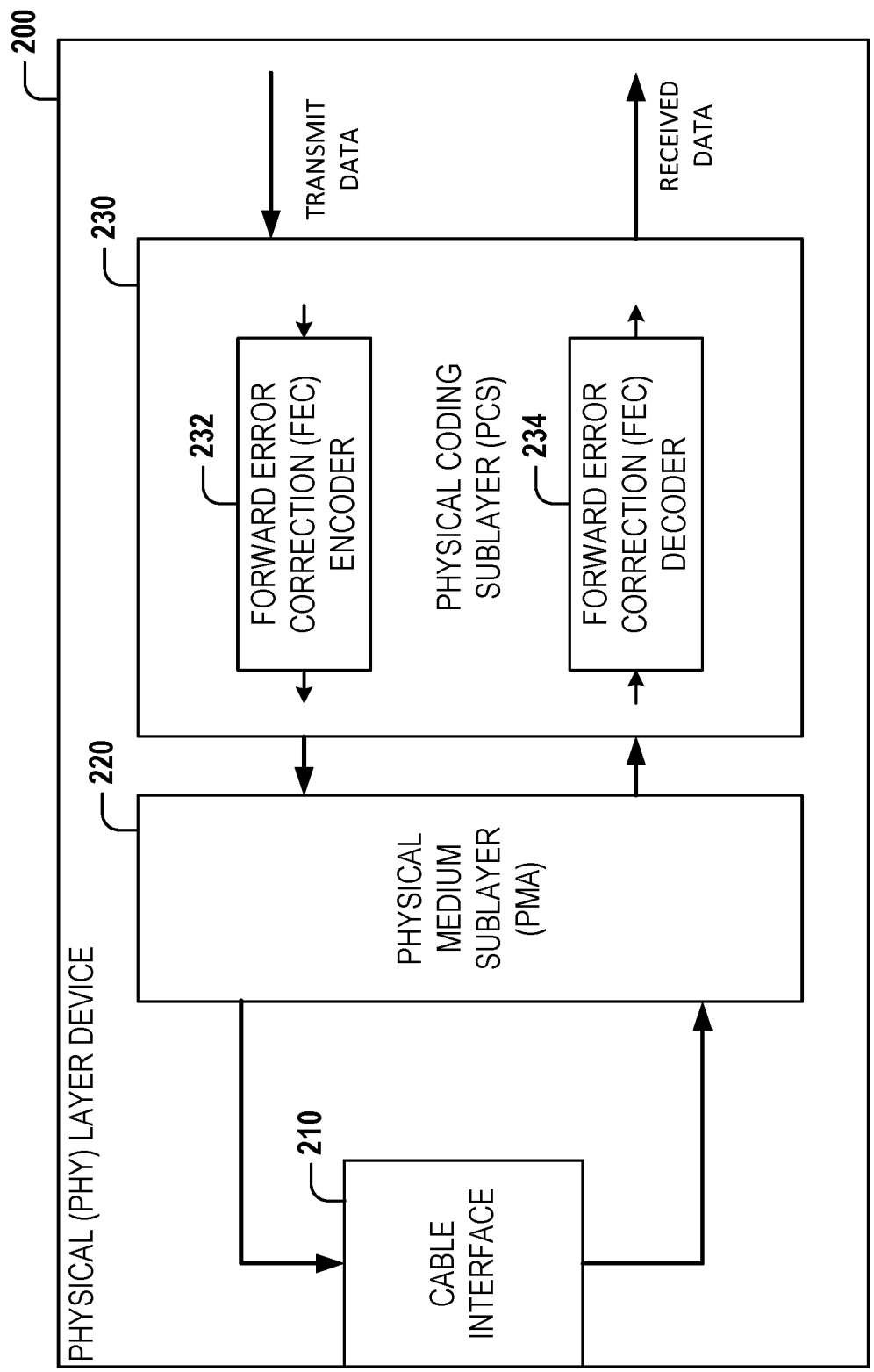
FIG. 2 is a diagram illustrating an example architecture of a physical (PHY) layer device in which a FEC decoder failure detection, in accordance with some embodiments, can be implemented.

FIG. 2 is a diagram illustrating an example architecture of a physical (PHY) layer device 200 in which a FEC decoder failure detection, in accordance with some embodiments, can be implemented. For some embodiments, the example architecture implements at least a part of the first physical layer device 112, the second physical layer device 122, or both. According to some embodiments, on a transmit data path of the physical layer device 200, transmit data (e.g., bits) to be transmitted to from the physical layer device 200 to another physical layer device (over a communication medium) is first processed within a physical coding sublayer (PCS) 230, which includes a forward error correction (FEC) encoder 232 and a forward error correction (FEC) decoder 234. The FEC encoder 232 can generate FEC encoded data by adding some redundant or parity data (e.g., bits) to the transmit data, and the FEC encoded data can be further processed in the PCS 230 and later in a physical medium sublayer (PMA) 220, which is responsible for signal processing before a signal carrying the FEC encoded data is transmitted to the other physical layer device (over the communication medium). The communication medium (e.g., wire or cable harness) between the physical layer device 200 and the other physical layer device can be operatively coupled to the physical layer device 200 via a cable interface 210 (e.g., comprising a block that splits transmit and receive signals).

According to some embodiments, on a receive path, a received signal on the wire is first passed through the PMA 220, which detects data (e.g., bits) carried by the received signal. The detected data is passed to the PCS 230, where the FEC decoder 234 decodes the detected data by using parity data and redundant data within the detected data to correct any data errors that exist, thereby generating received data at the physical layer device 200.

Figure 3:
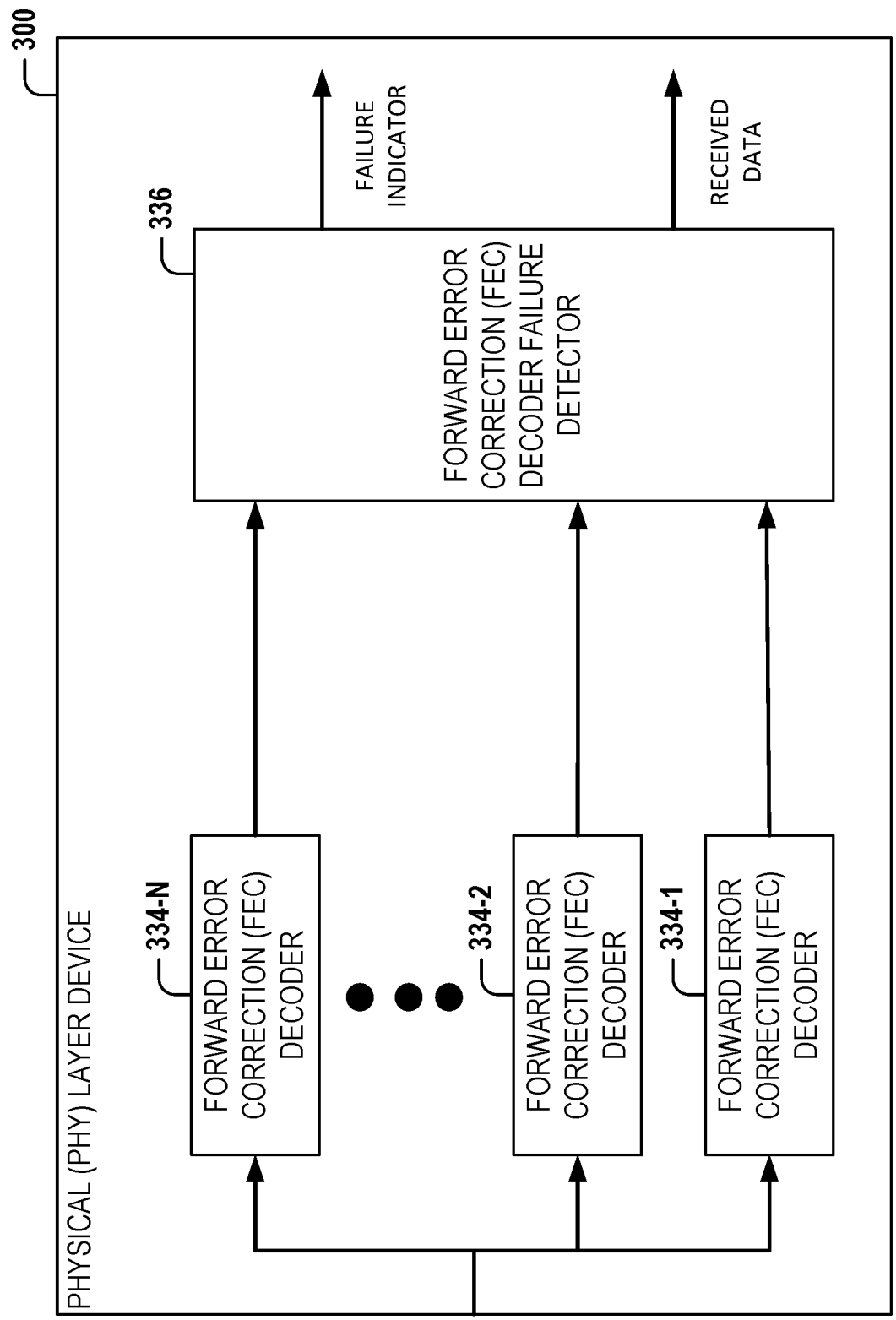
FIG. 3 is a diagram illustrating an example physical layer (PHY) device enabled for detecting failure of its FEC decoder, in accordance with some embodiments.

FIG. 3 is a diagram illustrating an example physical (PHY) layer device 300 enabled for detecting failure of its FEC decoder, in accordance with some embodiments. In particular, the physical layer device 300 represents an example of a physical layer device that detects failure of at least one its FEC decoders (e.g., a (first) FEC decoder 334-1) using one or more redundant FEC decoders (e.g., FEC decoders 334-2 through 334-N).

The physical layer device 300 is configured to communicate data with another physical layer device over a data transmission medium. As shown, the physical layer device 300 comprises multiple FEC decoders 334-1 through 334-N (collectively referred to as FEC decoders 334), and a forward error correction (FEC) decoder failure detector 336. Though not illustrated, for some embodiments, the physical layer device 300 has as little as two FEC decoders. Each of the FEC decoders 334 is configured to receive one or more data frames and generate forward error correction output data for each of the one or more data frames. Each of the FEC decoders 334 is configured to operate, at the same speed, on the same received data frames in parallel. The FEC decoder failure detector 336 receives forward error correction output data from each of the FEC decoders 334.

The forward error correction decoder failure detector 336 is configured to receive, from each of the FEC decoders 334, forward error correction output data for an individual data frame processed by each of the FEC decoders 334 in parallel. For instance, the forward error correction decoder failure detector 336 can receive, from the FEC decoder 334-1, a first forward error correction output data for an individual data frame. Additionally, the forward error correction decoder failure detector 336 can receive, from the forward error correction decoder 334-2, a second forward error correction output data for the individual data frame. This can continue for each of the FEC decoders 334 used. For various embodiments, the individual data frame includes encoded data that is encoded by another physical layer device using a forward error correction process to carry payload data.

The forward error correction decoder failure detector 336 is configured to determine whether all of the forward error correction output data received (by forward error correction decoder failure detector 336) for the individual data frame match. For instance, the forward error correction decoder failure detector 336 can determine whether the first forward error correction output data matches the second forward error correction output data. The forward error correction decoder failure detector 336 is configured to generate a failure indication (e.g., FEC decoder failure flag) via the failure indicator in response to determining that not all the forward error correction output data match (e.g., the first forward error correction output data does not match the second forward error correction output data). Generation of the failure indication represents a failure in operation is detected in at least one of the FEC decoders 334. Where all of the forward error correction output data match, no failure indication is generated, and all of the FEC decoders 334 can be considered to be valid and operational. Payload data decoded from the individual data frame is output by the forward error correction decoder failure detector 336 as received data. According to various embodiments, forward error correction output data generated for an individual data frame by one of the FEC decoders 334 comprises decoded payload data (e.g., corrected payload data) from the individual data frame. Additionally, for some embodiments, forward error correction output data generated for an individual data frame by one of the FEC decoders 334 comprises operation information (e.g., internal information) generated by the FEC decoder during decoding of the decoded payload data from the individual data frame.

Where a failure in operation of one of the FEC decoders 334 is detected (and a failure indication is generated), the forward error correction decoder failure detector 336 can generate decoded payload data based on the forward error correction output data received from each of the FEC decoders 334. In particular, the forward error correction decoder failure detector 336 can determine a majority vote based on the forward error correction output data received from each of the FEC decoders 334, and generate the payload data (e.g., corrected payload data) based on the majority vote.

Figure 4:
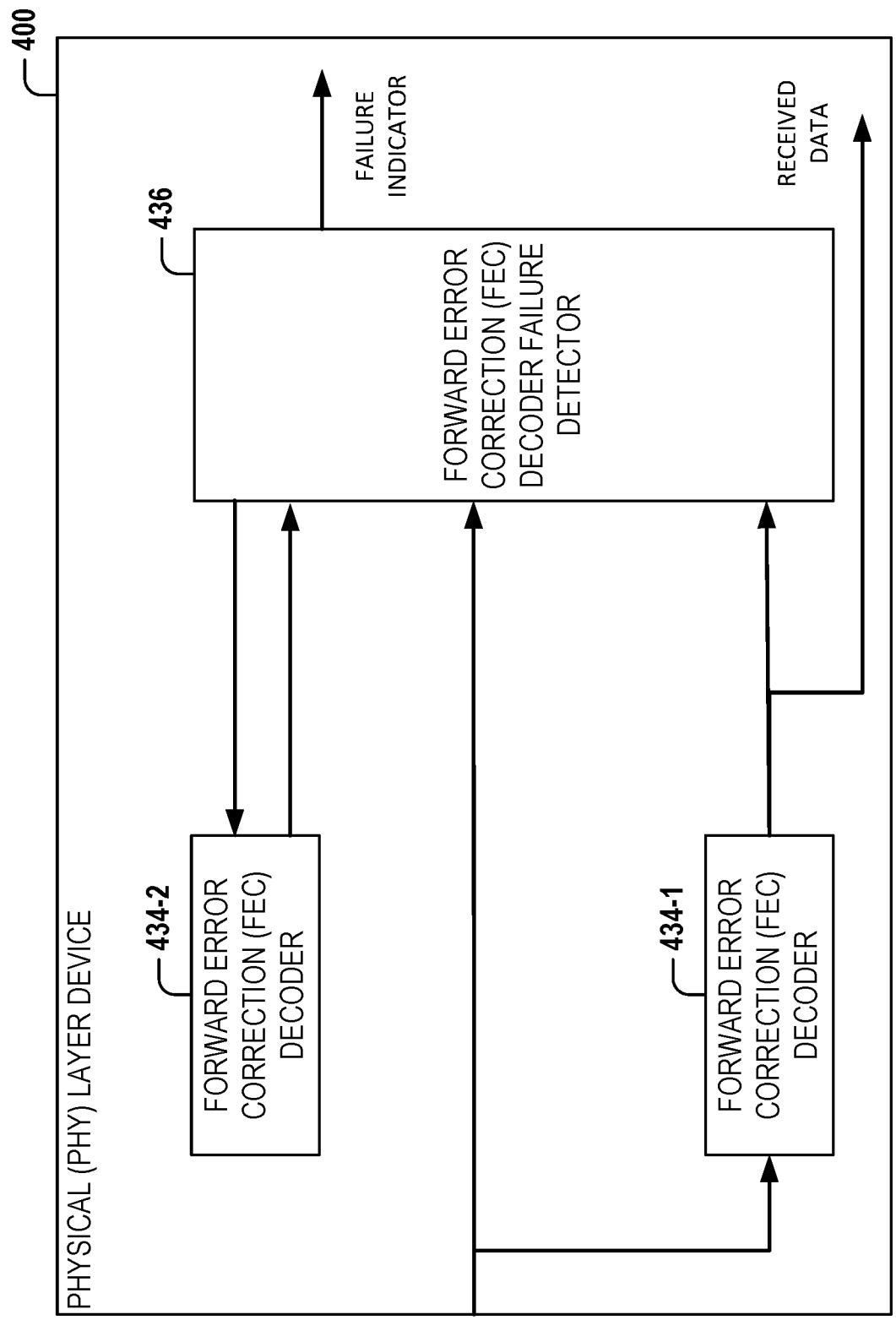
FIG. 4 is a diagram illustrating an example physical layer device (PHY) enabled for detecting failure of its FEC decoder, in accordance with some embodiments.

FIG. 4 is a diagram illustrating an example physical (PHY) layer device 400 enabled for detecting failure of its FEC decoder, in accordance with some embodiments. In particular, the physical layer device 400 represents an example of a physical layer device that detects failure of a (first) FEC decoder 434-1 by periodically using another (second) FEC decoder 434-2 in parallel with the FEC decoder 434-1 to check whether the FEC decoder 434-1 is behaving in identical manner as the FEC decoder 434-2. For some embodiments, the FEC decoder 434-1 represents a main FEC decoder of the physical layer device 400, while the FEC decoder 434-2 represents a redundant FEC decoder of the physical layer device 400.

The physical layer device 400 is configured to communicate data with another physical layer device over a data transmission medium. As shown, the physical layer device 400 comprises a (first) FEC decoder 434-1, a (second) FEC decoder 434-2, and a forward error correction (FEC) decoder failure detector 436.

According to various embodiments, the FEC decoder 434-2 is configured to operate at a slower speed (e.g., a slower data rate) than the FEC decoder 434-1. The FEC decoder 434-1 is configured to receive data frames generated by another physical layer device (e.g., 122). Payload data decoded from data frames received by the FEC decoder 434-1 is output by the FEC decoder 434-1 as received data. The forward error correction decoder failure detector 436 is configured to capture a sample data frame from the data frames received by the FEC decoder 434-1. For various embodiments, the sample data frame includes encoded data that is encoded by the other physical layer device (e.g., 122) using a forward error correction process to carry payload data. The forward error correction decoder failure detector 436 is configured to cause the sample data frame to be processed by the FEC decoder 434-2 (e.g., by passing the sample data frame to 434-2), and receive, from the FEC decoder 434-2, a second forward error correction output data for the sample data frame. Additionally, the forward error correction decoder failure detector 436 is configured to receive, from the FEC decoder 434-1, a first forward error correction output data for the (same) sample data frame. The forward error correction decoder failure detector 436 is configured to determine whether the first forward error correction output data received (from 434-1) for the sample data frame matches the second forward error correction output data received (from 434-2).

The forward error correction decoder failure detector 436 is configured to generate a failure indication (e.g., FEC decoder failure flag) via the failure indicator in response to determining that the first forward error correction output data does not match the second forward error correction output data. Generation of the failure indication represents a failure in operation is detected in at least one of the FEC decoder 434-1 or the FEC decoder 434-2. Where the first and the second forward error correction output data match, no failure indication is generated, and both the FEC decoders 434-1 can be considered to be valid and operational. According to various embodiments, forward error correction output data generated for a sample data frame by the FEC decoder 434-1 comprises decoded payload data (e.g., corrected payload data) from the sample data frame. Additionally, for some embodiments, forward error correction output data generated for the sample data frame by the FEC decoders 434-1 comprises operation information (e.g., internal information) generated by the FEC decoder 434-1 during decoding of the decoded payload data from the individual data frame.

For various embodiments, the forward error correction decoder failure detector 436 is configured to periodically capture sample data frames, cause those sample data frames to be processed by the FEC decoder 434-2, comparing the output of the FEC decoder 434-2 with the output of the FEC decoder 434-1, and generating a failure indication of the FEC decoder 434-1 based on the comparison. The period for performing these operations can be based on time or data frame interval (e.g., number of data frames).

Figure 5:
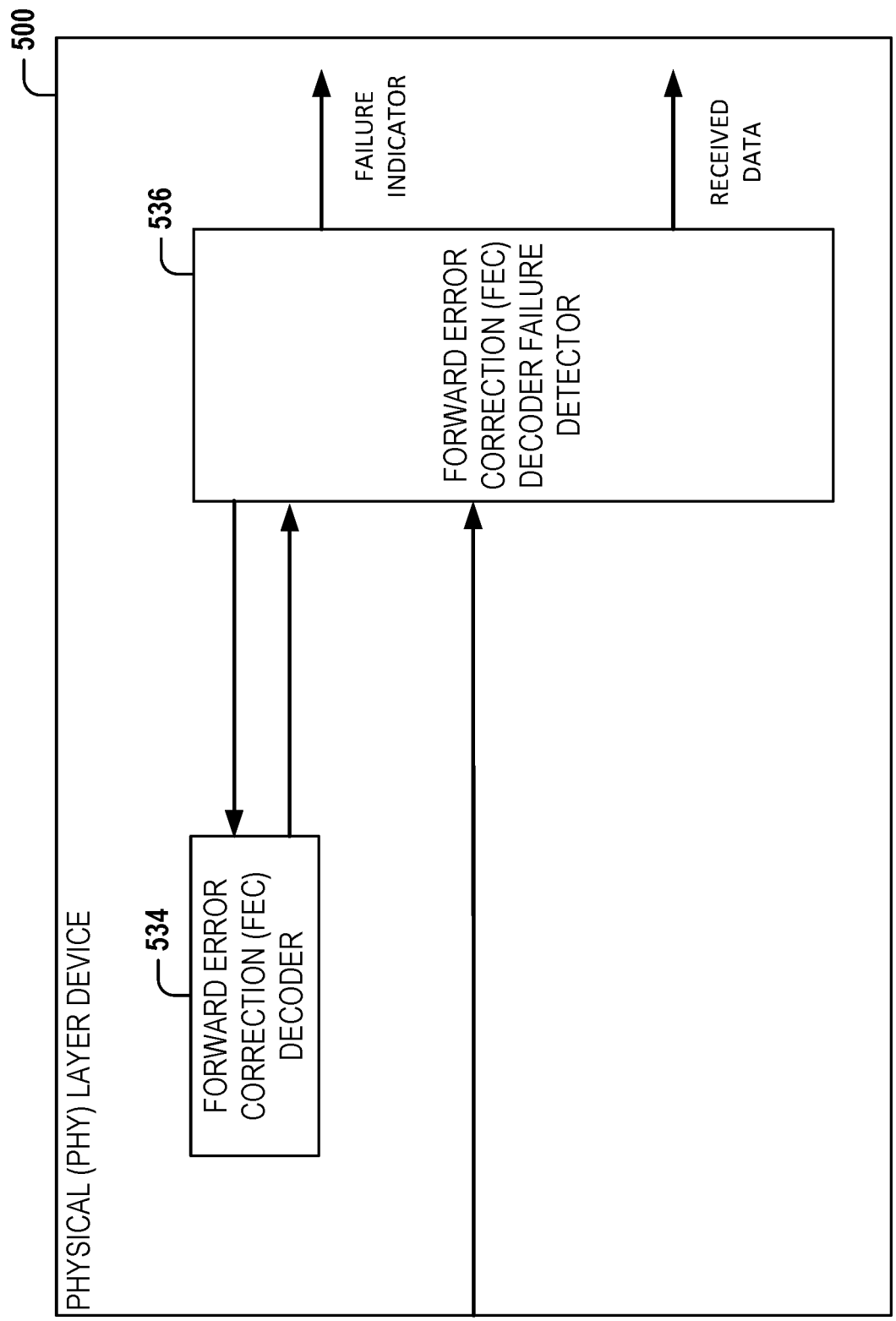
FIG. 5 is a diagram illustrating an example physical (PHY) layer device enabled for detecting failure of its FEC decoder, in accordance with some embodiments.

FIG. 5 is a diagram illustrating an example physical (PHY) layer device 500 enabled for detecting failure of its FEC decoder, in accordance with some embodiments. In particular, the physical layer device 500 represents an example of a physical layer device that detects failure of at least one its FEC decoder 534 by checking the health of the FEC decoder 534 when it can be taken off the data path (e.g., not needed to process incoming data to decoded useful information).

The physical layer device 500 is configured to communicate data with another physical layer device over a data transmission medium. As shown, the physical layer device 500 comprises a single FEC decoder 534, and a forward error correction (FEC) decoder failure detector 536.

The forward error correction decoder failure detector 536 is configured to receive data frames generated by another physical layer device (e.g., 122). The forward error correction decoder failure detector 536 is configured to determine whether a received data frame (from the data frames received) is carrying expected payload data (e.g., relevant or useful information). The forward error correction decoder failure detector 536 is configured to cause the FEC decoder 534 to process a predetermined data pattern in response to determining that the received data frame is not carrying expected payload data (e.g., within automotive network application, received data frame is carrying video data for after a vehicle has just started, is parked, or stopped at a red light). For some embodiments, the predetermined data pattern comprises one or more predetermined data frames, with a predetermined (e.g., expected) output from the FEC decoder 534. The forward error correction decoder failure detector 536 is configured to receive, from the FEC decoder 534, forward error correction output data for the predetermined data pattern. The forward error correction decoder failure detector 536 is configured to determine whether the forward error correction output data matches an expected forward error correction output data for the predetermined data pattern. The forward error correction decoder failure detector 536 is configured to generate a failure indication (e.g., FEC decoder failure flag) via the failure indicator in response to determining that the forward error correction output data does not match the expected forward error correction output data (e.g., expected value). Generation of the failure indication represents a failure in operation is detected the FEC decoder 534. Where the forward error correction output data matches the expected forward error correction output data, no failure indication is generated, and the FEC decoders 534 can be considered to be valid and operational. Payload data decoded from data frames received by the forward error correction decoder failure detector 536 is output by the forward error correction decoder failure detector 536 as received data.

The forward error correction decoder failure detector 536 is configured to continue normal user of the FEC decoder 534 in response to determining that the received data frame is carrying expected payload data. In particular, in response to determining that the received data frame is carrying expected payload data, the forward error correction decoder failure detector 536 can cause the received data frame (received by the forward error correction decoder failure detector 536) to be processed by the FEC decoder 534. The forward error correction decoder failure detector 536 can receive, from the forward error correction decoder, second forward error correction output data for the received data frame, the second forward error correction output data comprising carried payload data that is decoded from the received data frame by the FEC decoder 534. Subsequently, the forward error correction decoder failure detector 536 can output the carried payload data as received data.

Figure 6:
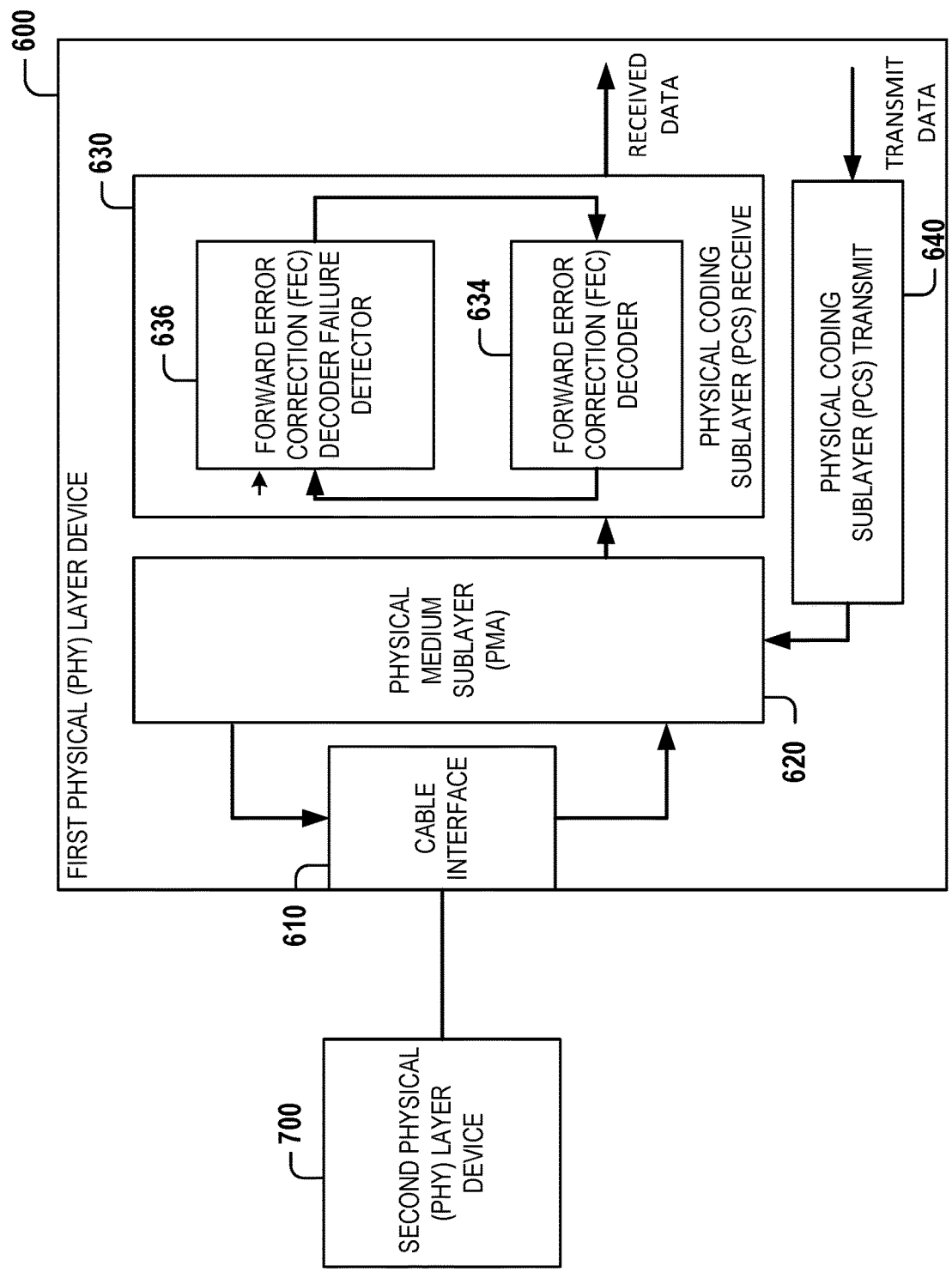
FIGS. 6 and 7 are diagrams illustrating example first and second physical (PHY) layer devices that enable detection of failure of a FEC decoder of the first physical (PHY) layer device, in accordance with some embodiments.
Figure 7:
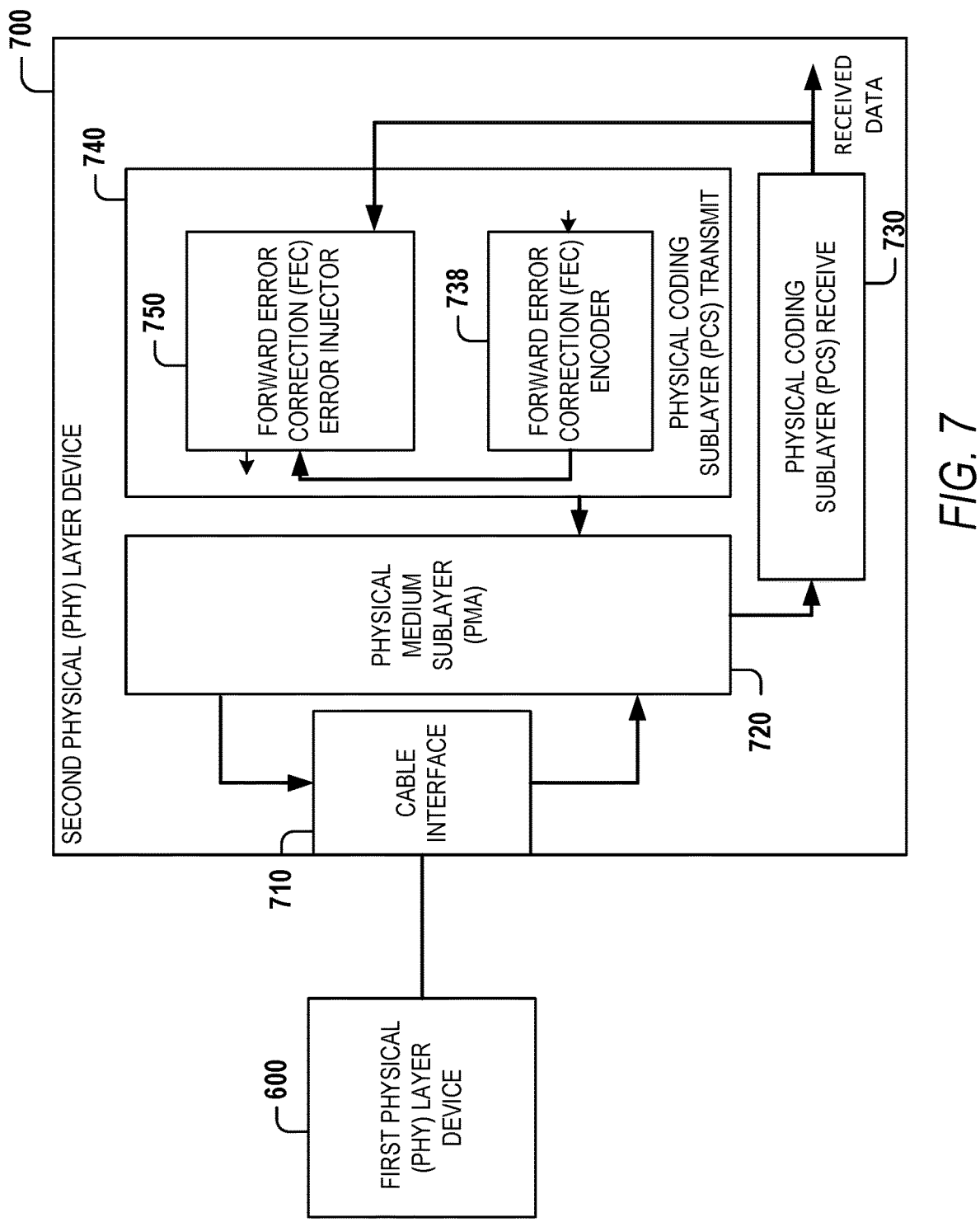

FIGS. 6 and 7 are diagrams illustrating example first and second physical (PHY) layer devices 600, 700 that enable detection of failure of a FEC decoder 634 of the first physical (PHY) layer device 600, in accordance with some embodiments. In particular, the first and second physical layer devices 600, 700 represent examples of physical layer devices that detect failure of the FEC decoder 634 (of the first physical layer device 600) by causing the second physical layer device 700 to send to the first physical layer device 600 data (e.g., in one or more designated data frames) that is intentionally injected with one or more errors (e.g., recoverable errors), and by determining whether the first physical layer device 600 is able to correct the data received from the second physical layer device 700 using the FEC decoder 634.

As shown in FIG. 6, the first physical layer device 600 comprises a cable interface 610, a physical medium sublayer (PMA) 620, a physical coding sublayer (PCS) receive 630 portion, and a physical coding sublayer (PCS) transmit 640 portion. The PCS receive 630 portion comprises a forward error correction (FEC) decoder 634, and a forward error correction (FEC) decoder failure detector 636. As shown in FIG. 7, the second physical layer device 700 comprises a cable interface 710, a physical medium sublayer (PMA) 720, a physical coding sublayer (PCS) receive 730 portion, and a physical coding sublayer (PCS) transmit 740 portion. The PCS transmit 740 portion comprises a forward error correction (FEC) encoder 738, and a forward error correction (FEC) error injector 750. The first and the second physical layer devices 600, 700 can be communicatively coupled by a data transmission medium (e.g., wire or cable harness) that is connected to the cable interfaces 610, 710 of the first and the second physical layer devices 600, 700 respectively. For some embodiments, the first and the second physical layer devices 600, 700 represent link partners, where the first physical layer device 600 represents a receiving link partner and the second physical layer device 700 represents a transmitting link partner.

As the transmitting link partner, the second physical layer device 700 makes predicable alterations (e.g., inserts of one or more recoverable errors) in one or more designated data frames transmitted from the second physical layer device 700 to the first physical layer device 600. In particular, the predictable alterations are made to one or more data words in a designated FEC frame after the parity words are calculated and inserted. As the receiving link partner, the first physical layer device 600 decodes the designed data frames (e.g., the designated FEC frame) and determines whether predictable alterations (e.g., the one or more recoverable errors) are corrected. The first and the second physical layer devices 600, 700 coordinate to facilitate the predictable alterations of one or more data frames transmitted by the second physical layer device 700. Depending on the embodiment, a FEC decoder failure detection process by the first and the second physical layer devices 600, 700 can be initiated periodically and can be initiated for different types of errors. Additionally, a FEC decoder failure detection process by the first and the second physical layer devices 600, 700 can be initiated with respect to the first physical layer device 600 by a component (e.g., application) at a higher layer than the first physical layer device 600 (e.g., instruction or request from the higher layer component).

During operation, to initiate the injection of one or more errors by the second physical layer device 700, the forward error correction decoder failure detector 636 causes the second physical layer device 700 to inject one or more errors into a designated data frame. In particular, the forward error correction decoder failure detector 636 (or some other component of the first physical layer device 600) can cause transmission of one or more messages (via the PCS transmit 640 portion) to the second physical layer device 700, where at least one message of the one or more messages requests the second physical layer device 700 to inject the one or more errors into the designated data frame. Depending on the embodiment, the at least one message specifies a at least one of: a number error words to be injected into the designated data frame; a position of error words within the designated data frame; an identifier of the designated data frame; or a type of error word to be injected into the designated data frame. For some embodiments, the one or more messages are operations, administrative, and management (OAM) messages transmitted over an OAM logical channel between the first and the second physical layer devices 600, 700. Use of the one or more messages can represent a coordination protocol used between the first and the second physical layer devices 600, 700. For various embodiments, the second physical layer device 700 receives the one or more messages and causes the FEC encoder 738 to generate the designated data frame (e.g., which carries relevant/useful or non-relevant/non-useful information), and the FEC error injector 750 to alter (e.g., modify) the designated data frame to inject the one or more errors (e.g., in accordance with one or more parameters of the one or more messages).

After the request, the forward error correction decoder failure detector 636 detects for when the designated data frame is received by the forward error correction decoder failure detector 636. For instance, where the first physical layer device is configured to OAM messages from the second physical layer device, and detecting for when the designated data frame is received by the forward error correction decoder failure detector comprises monitoring a counter value included in (e.g., counter field of) OAM messages received from the second physical layer device 700, where the counter value indicates a number of data frames that will be received by the first physical layer device 600 before the designated data frame is received (from the second physical layer device 700) by the first physical layer device 600. Depending on the embodiment, the counter value in the OAM messages can be incremented or decremented for every data frame that is transmitted from the second physical layer device 700 to the first physical layer device 600. For instance, where the counter value is decremented, the designated data frame can be expected when the counter value in an OAM message reaches 0. Where the counter value is incremented, the designated data frame can be expected when the counter value in an OAM message reaches a predetermined value (e.g., a value determined by the first and the second physical layer devices 600, 700 via coordination).

In response to detecting the designated data frame, the forward error correction decoder failure detector 636 causes the designated data frame to be processed by the FEC decoder 634, and receives, from the FEC decoder 634, forward error correction output data for the designated data frame. Based on the forward error correction output data, the forward error correction decoder failure detector 636 determines whether the FEC decoder 634 corrected the one or more errors injected into the designated data frame by the second physical layer device 700. Subsequently, the forward error correction decoder failure detector 636 generates a failure indication in response to determining that the FEC decoder 634 failed to correct the one or more (expected) errors injected into the designated data frame by the second physical layer device 700.

For some embodiments, the one or more errors (injected into the designated data frame by the second physical layer device 700) are recoverable by the forward error correction decoder failure detector 636 without use of the FEC decoder 634. In response to determining that the FEC decoder 634 failed to correct the one or more errors injected into the designated data frame by the second physical layer device 700, the forward error correction decoder failure detector 636 can correct the one or more errors without use of the forward error correction decoder in response to determining that the forward error correction decoder failed to correct the one or more errors. In this way, some embodiments can avoid the intentional injection of the one or more errors resulting loss of FEC capability (as the errors can be corrected without the FEC decoder 634 assistance when the FEC decoder 634 has failed to operate properly). Examples of injection of a recoverable error includes, without limitation: flipping all bits in a data word (e.g., the forward error correction decoder failure detector 636 can recover the data word by flipping all bits in the data word); and swapping correct values in two data words (e.g., the forward error correction decoder failure detector 636 can recover the data words by swapping their values).

FIGS. 8 through 11 are flowcharts illustrating example methods 800, 900, 1000, 1100 for detecting failure of a FEC decoder in a physical (PHY) layer device, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 800, 900, 1000, 1100 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Figure 8:
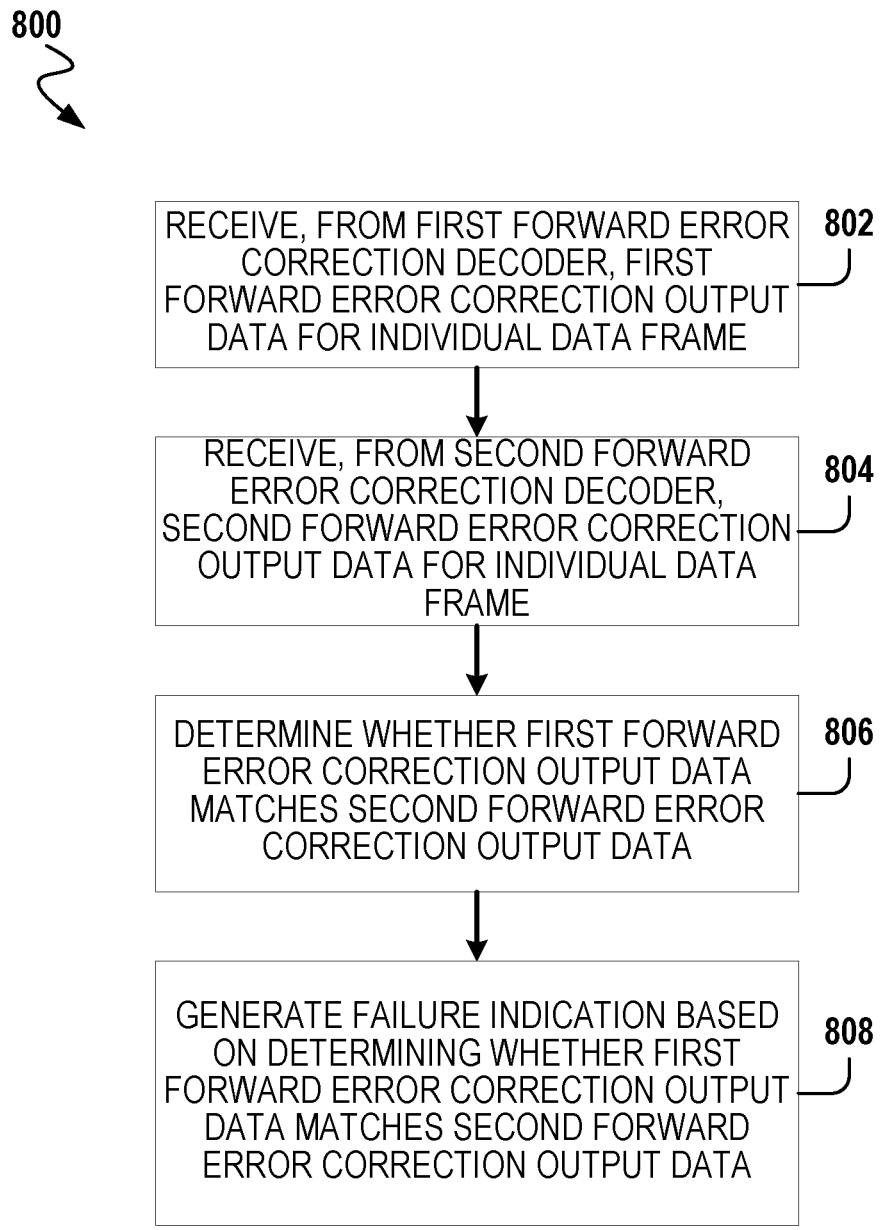
FIGS. 8 through 11 are flowcharts illustrating example methods for detecting failure of a FEC decoder in a physical (PHY) layer device, in accordance with some embodiments.

Referring now to FIG. 8, the method 800 can be performed by the physical layer device 300 of FIG. 3. At operation 802, a forward error correction decoder failure detector (e.g., 336) of a physical layer device (e.g., 300) receives, from a first forward error correction decoder (e.g., 334-1) of the physical layer device (e.g., 300), first forward error correction output data for an individual data frame. The first forward error correction decoder generates the first forward error correction output data by decoding the individual data frame. For some embodiments, the individual data frame comprises encoded data that is encoded by another physical layer device (e.g., 122) using a forward error correction process to carry payload data.

At operation 804, the forward error correction decoder failure detector (e.g., 336) of the physical layer device (e.g., 300) receives, from a second forward error correction decoder (e.g., 334-2) of the physical layer device (e.g., 300), second forward error correction output data for the individual data frame. The second forward error correction decoder generates the second forward error correction output data by decoding the individual data frame.

At operation 806, the forward error correction decoder failure detector (e.g., 336) determines whether the first forward error correction output data (e.g., from 334-1) matches the second forward error correction output data (e.g., from 334-2). Based on the determination of operation 806, at operation 808, the forward error correction decoder failure detector (e.g., 336) generates a failure indication. For instance, if the first forward error correction output data and the second forward error correction output data do not match, the failure indication is generated at operation 808.

Figure 9:
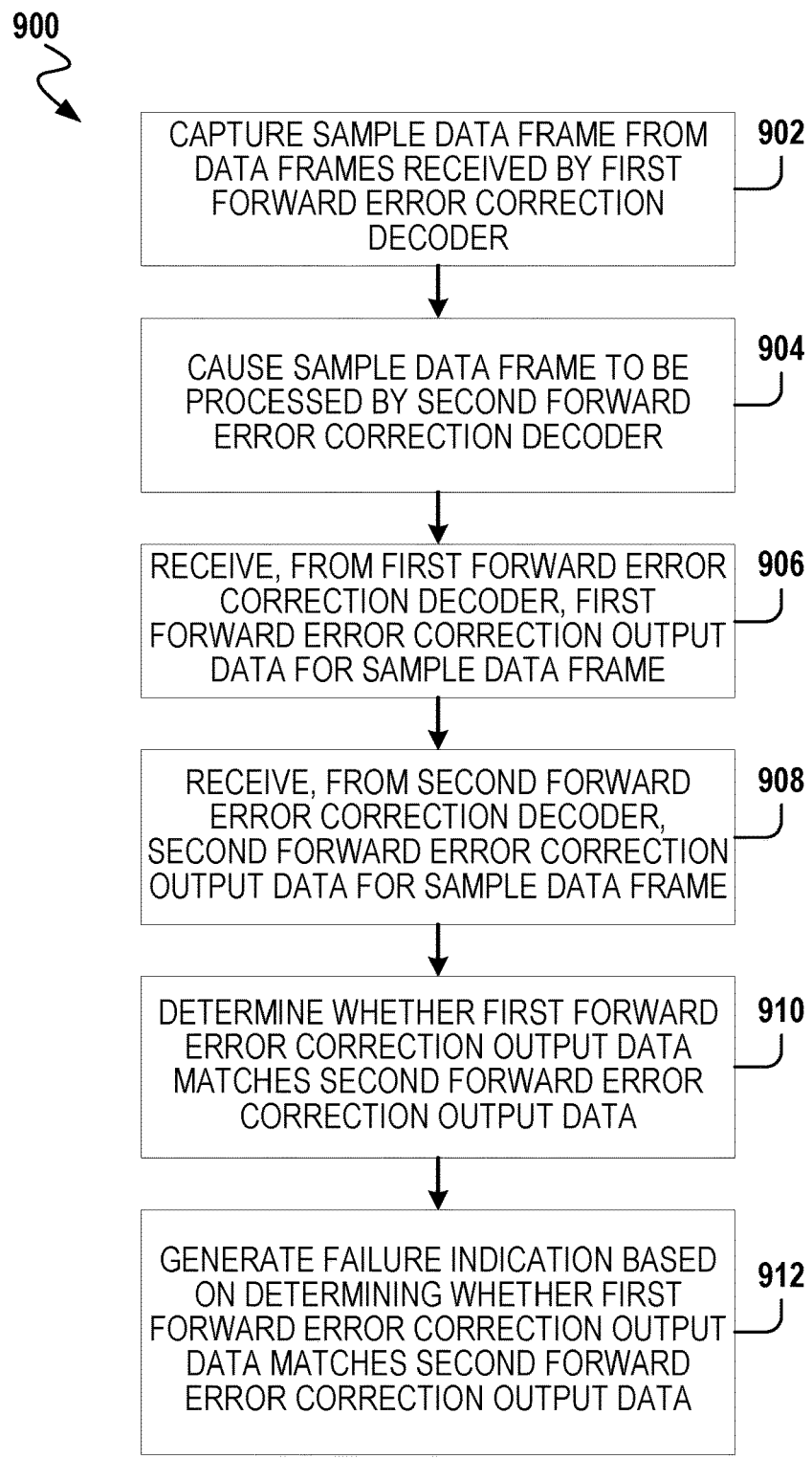

Referring now to FIG. 9, the method 900 can be performed by the physical layer device 400 of FIG. 4. For some embodiments, the method 900 is performed periodically (e.g., based on time or data frame interval). At operation 902, a forward error correction decoder failure detector (e.g., 436) of a physical layer device (e.g., 400) captures a sample data frame from data frames received by a first FEC decoder (e.g., 434-1). Thereafter, at operation 904, the forward error correction decoder failure detector (e.g., 436) causes the sample data frame to be processed by the second FEC decoder (434-2).

At operation 906, the forward error correction decoder failure detector (e.g., 436) receives, from the FEC decoder (e.g., 434-1), a first forward error correction output data for the sample data frame. Additionally, at operation 908, the forward error correction decoder failure detector (e.g., 436) receives, from the second FEC decoder (e.g., 434-2), a second forward error correction output data for the sample data frame. According to various embodiments, the second FEC decoder (e.g., 434-2) operates at a slower speed (e.g., slower data rate) than the first FEC decoder (e.g., 434-1).

At operation 910, the forward error correction decoder failure detector (e.g., 436) determines whether the first forward error correction output data matches the second forward error correction output data. Based on the determination of operation 910, at operation 912, the forward error correction decoder failure detector (e.g., 436) generates a failure indication. For instance, if the first forward error correction output data and the second forward error correction output data do not match, the failure indication is generated at operation 912.

Figure 10:
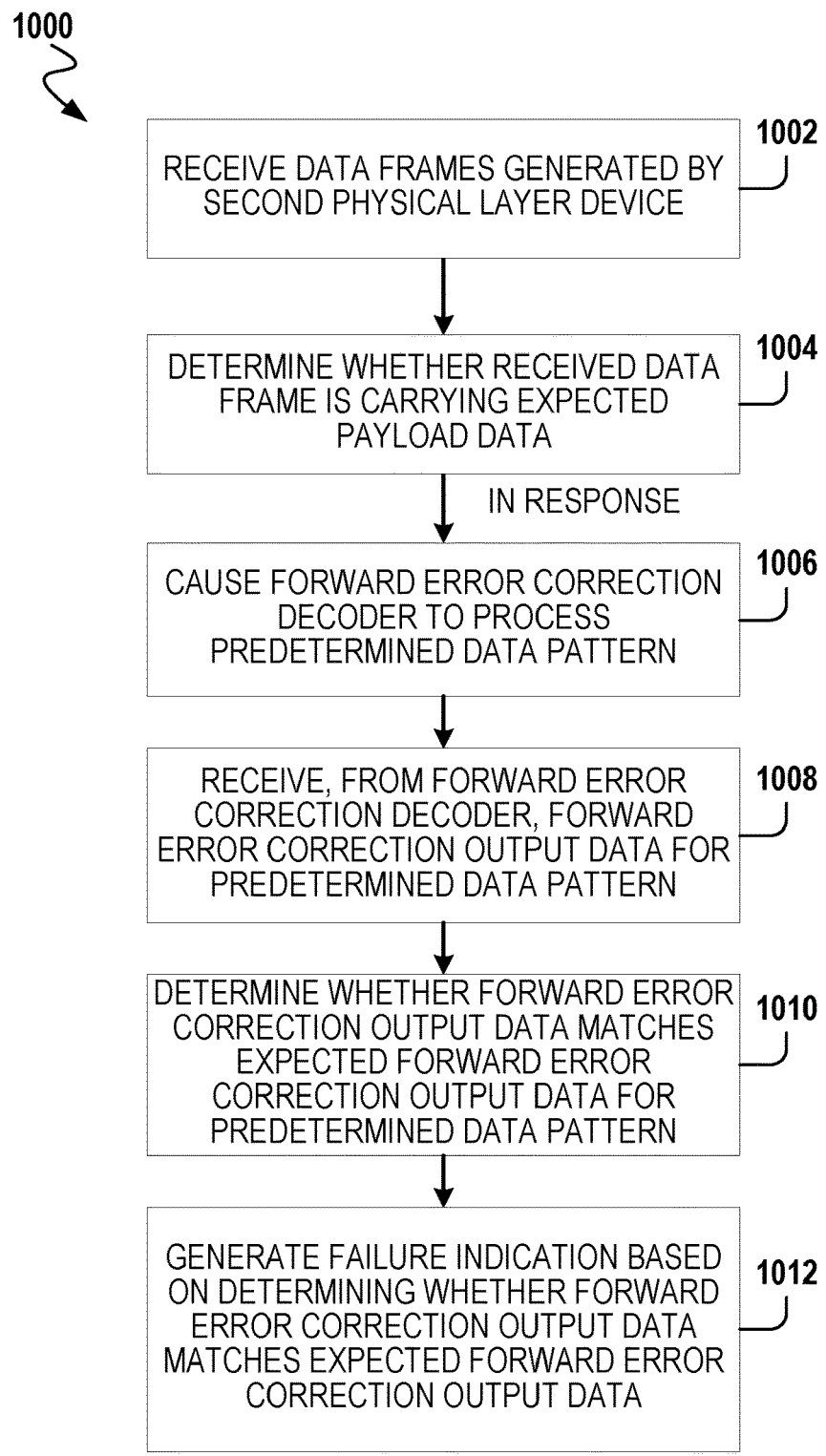

Referring now to FIG. 10, the method 1000 can be performed by the physical layer device 500 of FIG. 5. At operation 1002, a forward error correction decoder failure detector (e.g., 536) of a physical layer device (e.g., 500) receives data frames generated by another physical layer device (e.g., 122). For some embodiments, operation 1004 is performed for each data frame received by the forward error correction decoder failure detector (e.g., 536).

At operation 1004, the forward error correction decoder failure detector (e.g., 536) determines whether a received data frame (from the data frames received at operation 1002) is carrying expected payload data (e.g., relevant or useful information). For some embodiments, this determination is made by the forward error correction decoder failure detector (e.g., 536) based on information or an indication provided by an entity that exists outside of the physical layer device (e.g., 500), such as a software entity operating outside the physical layer device. For instance, the external entity can indicate to the physical layer device that the car is stopped or in idle mode and the data frames from the other physical layer device (e.g., part of a camera sensor) has no relevance or usefulness at the moment. Based on this indication or information from the external entity, the forward error correction decoder failure detector (e.g., 536) can determine whether the received data frame (from the data frames received at operation 1002) is carrying expected payload data (e.g., relevant or useful information) and whether to perform FEC detection by proceeding to operation 1006.

In response to determining that the received data frame is not carrying expected payload data (e.g., is carrying idle data frames), at operation 1006, the forward error correction decoder failure detector (e.g., 536) causes a FEC decoder (e.g., 534) of the physical layer device (e.g., 500) to process a predetermined data pattern. Thereafter, at operation 1008, the forward error correction decoder failure detector (e.g., 536) receives from the FEC decoder (e.g., 534), forward error correction output data for the predetermined data pattern. The forward error correction decoder failure detector (e.g., 536), at operation 1010, determines whether the forward error correction output data (received at operation 1008) matches an expected forward error correction output data for the predetermined data pattern. For some embodiments, operation 1006 comprises injecting a known data bit pattern into the input of the FEC decoder and operation 1010 comprises comparing the output of the FEC decoder (received at operation 1008) with expected output bits.

Based on the determination of operation 1010, the forward error correction decoder failure detector (e.g., 536) generates a failure indication (e.g., FEC decoder failure flag) via the failure indicator. For instance, in response to determining that the forward error correction output data does not match the expected forward error correction output data (e.g., expected value), the forward error correction decoder failure detector (e.g., 536) can generate a failure indication at operation 1012.

Figure 11:
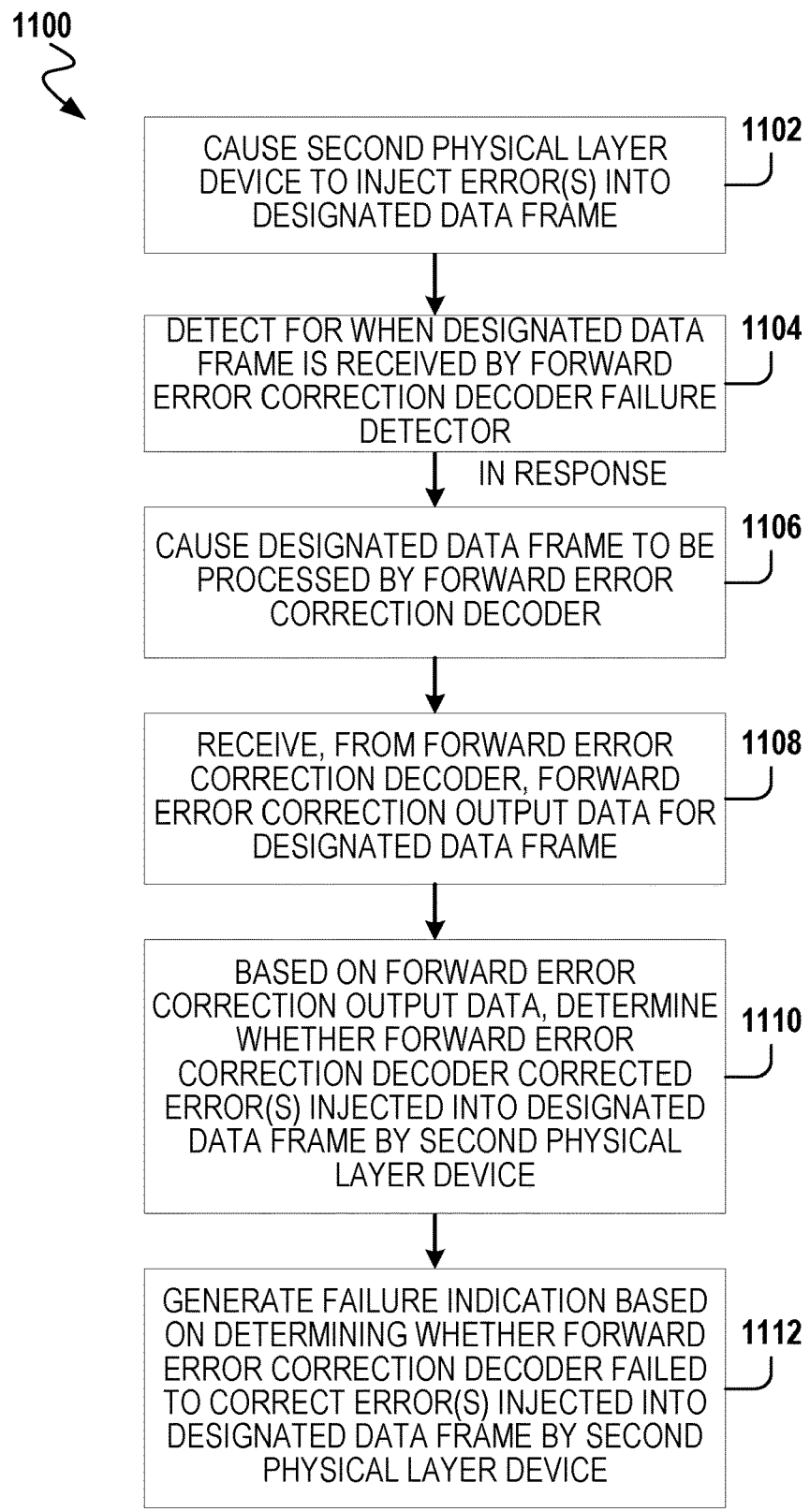

Referring now to FIG. 11, the method 1100 can be performed by the physical layer devices 600, 700 of FIGS. 7 and 8. At operation 1102, a forward error correction decoder failure detector (e.g., 636) of the first physical layer device (e.g., 600) causes a second physical layer device (e.g., 700) to inject one or more errors into a designated data frame. Thereafter, at operation 1104, the forward error correction decoder failure detector (e.g., 636) detects for when the designated data frame is received by the forward error correction decoder failure detector (e.g., 636). In response to detecting the designated data frame, at operation 1106, the forward error correction decoder failure detector (e.g., 636) causing the designated data frame to be processed by a forward error correction decoder (e.g., 634). At operation 1108, the forward error correction decoder failure detector (e.g., 636) receives, from the forward error correction decoder (e.g., 634), forward error correction output data for the designated data frame. Based on the forward error correction output data (received at operation 1108), at operation 1110, the forward error correction decoder failure detector (e.g., 636) determines whether the FEC decoder (e.g., 634) corrected the one or more errors injected into the designated data frame by the second physical layer device (e.g., 700). At operation 1112, the forward error correction decoder failure detector (e.g., 636) generates a failure indication in response to determining that the forward error correction decoder failed to correct the one or more errors injected into the designated data frame by the second physical layer device (e.g., 700).

Figure 12:
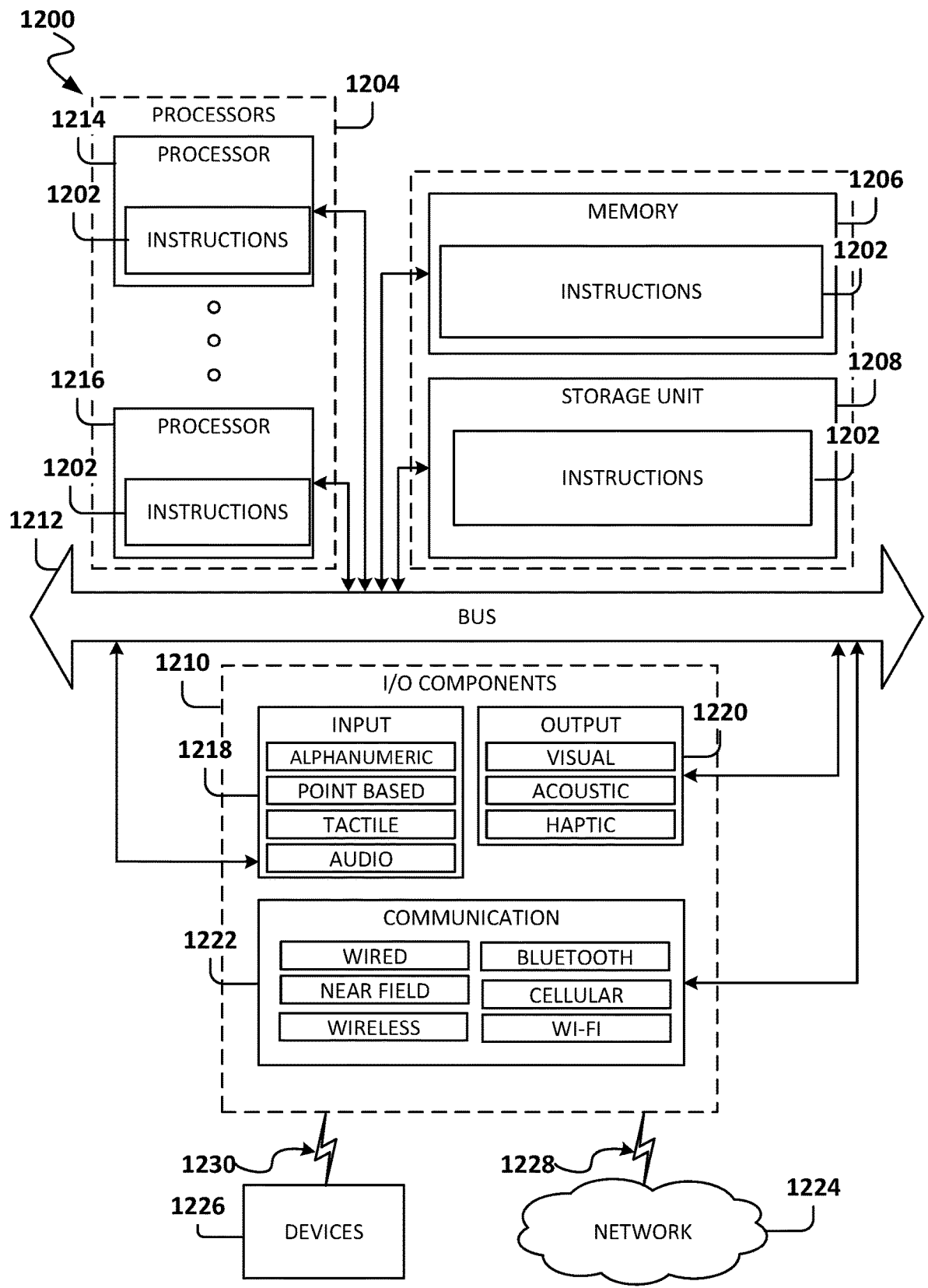
FIG. 12 is a block diagram illustrating components of an example machine that can use one or more embodiments discussed herein.

FIG. 12 is a block diagram illustrating components of an example machine 1200 that can use one or more embodiments discussed herein. Specifically, FIG. 12 shows a diagrammatic representation of the machine 1200 in the example form of a system, within which instructions 1202 (e.g., software, a program, an application, an applet, an app, a driver, or other executable code) for causing the machine 1200 to perform one or more operations that may make use of one or more of the methodologies discussed herein. For example, the instructions 1202 include executable code that causes the machine 1200 to execute one or more operations that cause a physical (PHY) layer device of the machine 1200 (e.g., embodied by communication components 1222) to perform the method 800, 900, 1000, 1100. The machine 1200 may be coupled (e.g., networked) to other machines. Depending on the embodiment, the machine 1200 can implement at least some portion of the first device 102 or the second device 104.

By way of non-limiting example, the machine 1200 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 1202, sequentially or otherwise, that specify actions to be taken by the machine 1200. Further, while only a single machine 1200 is illustrated, the term "machine" shall also be taken to include a collection of machines 1200 that individually or jointly execute the instructions 1202.

The machine 1200 may include processors 1204, memory 1206, a storage unit 1208, and I/O components 1210, which may be configured to communicate with each other such as via a bus 1212. In some embodiments, the processors 1204 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1214 and a processor 1216 that may execute the instructions 1202. The term "processor" is intended to include multi-core processors 1204 that may comprise two or more independent processors (sometimes referred to as "cores") that may execute instructions 1202 contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory 1206 (e.g., a main memory or other memory storage) and the storage unit 1208 are both accessible to the processors 1204 such as via the bus 1212. The memory 1206 and the storage unit 1208 store the instructions 1202. The instructions 1202 may also reside, completely or partially, within the memory 1206, within the storage unit 1208, within at least one of the processors 1204 (e.g., within the processor's cache memory), or any suitable combination thereof, during execution thereof by the machine 1200. Accordingly, the memory 1206, the storage unit 1208, and the memory of the processors 1204 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1202. The term "machine-readable medium" shall also be taken to include any medium, or combination of multiple media, that is capable of storing instructions (e.g., instructions 1202) for execution by a machine (e.g., machine 1200), such that the instructions, when executed by one or more processors of the machine (e.g., processors 1204), cause the machine to perform one or more operations that makes use of one or more of the methodologies described herein (e.g., the method 800, 900, 1000, 1100). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1210 may include a wide variety of components to receive input, provide output, produce output, transmit information, exchange information, capture measurements, and so on. The specific I/O components 1210 that are included in a particular machine 1200 will depend on the type of the machine 1200. For example, portable machines such as mobile phones will likely include a touch input device or other such input mechanisms, while a headless server machine will likely not include such a touch input device. It will be appreciated that the I/O components 1210 may include many other components that are not specifically shown in FIG. 12. The I/O components 1210 are grouped according to functionality merely for simplifying the following discussion and the grouping is in no way limiting. In various embodiments, the I/O components 1210 may include input components 1218 and output components 1220. The input components 1218 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 1220 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1210 may include communication components 1222 operable to couple the machine 1200 to a network 1224 or devices 1226 via a coupling 1228 and a coupling 1230 respectively. For example, the communication components 1222 may include a network interface component or another suitable device to interface with the network 1224. In further examples, the communication components 1222 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1226 may be another machine or any of a wide variety of peripheral devices. According to various embodiments, the communication components 1222 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a first physical layer device configured to communicate data with a second physical layer device over a data transmission medium, the first physical layer device comprising:
  a plurality of forward error correction decoders, each decoder in the plurality of forward error correction decoders being configured to receive one or more data frames and generate forward error correction output data for each of the one or more data frames; and
  a forward error correction decoder failure detector configured to perform operations:
    receiving, from a first forward error correction decoder, a first forward error correction output data for an individual data frame, the individual data frame comprising encoded data that is encoded by the second physical layer device using a forward error correction process to carry payload data, the first forward error correction output data comprises first decoded payload data, the first decoded payload data representing the payload data as corrected by the first forward error correction decoder and as decoded from the encoded data by the first forward error correction decoder;
    receiving, from a second forward error correction decoder, a second forward error correction output data for the individual data frame, the second forward error correction output data comprises second decoded payload data, the second decoded payload data representing the payload data as corrected by the second forward error correction decoder and as decoded from the encoded data by the second forward error correction decoder;
    determining whether the first forward error correction output data matches the second forward error correction output data; and
    generating a failure indication in response to determining that the first forward error correction output data does not match the second forward error correction output data.

2. The system of claim 1, wherein the forward error correction decoder failure detector is configured to perform the operations for each data frame received by the first physical layer device.

3. The system of claim 1, wherein each decoder in the plurality of forward error correction decoders is configured to operate at a similar data speed.

4. The system of claim 1, wherein the first forward error correction output data comprises first operation information generated by the first forward error correction decoder during decoding of the first decoded payload data from the encoded data, and the second forward error correction output data comprises second operation information generated by the second forward error correction decoder during decoding of the second decoded payload data from the encoded data.

5. The system of claim 1, wherein the forward error correction decoder failure detector is configured to:

in response to determining that the first forward error correction output data does not match the second forward error correction output data:
  generating decoded payload data based on the forward error correction output data received from each decoder in the plurality of forward error correction decoders.

6. The system of claim 5, wherein the generating of the decoded payload data based on the forward error correction output data received from each decoder in the plurality of forward error correction decoders comprises:
  determining a majority vote based on the forward error correction output data received from each decoder in the plurality of forward error correction decoders; and
  generating the payload data based on the majority vote.

7. A system comprising:
a first physical layer device configured to communicate data with a second physical layer device over a data transmission medium, the first physical layer device comprising:
  a first forward error correction decoder configured to receive data frames generated by the second physical layer device;
  a second forward error correction decoder configured to operate at a slower data rate than the first forward error correction decoder; and
  a forward error correction decoder failure detector configured to periodically perform operations comprising:
    capturing a sample data frame from the data frames received by the first forward error correction decoder, the sample data frame comprising encoded data that is encoded by the second physical layer device using a forward error correction process to carry payload data;
    causing the sample data frame to be processed by the second forward error correction decoder;
    receiving, from the first forward error correction decoder, a first forward error correction output data for the sample data frame, the first forward error correction output data comprises first decoded payload data, the first decoded payload data representing the payload data as corrected by the first forward error correction decoder and as decoded from the encoded data by the first forward error correction decoder;
    receiving, from the second forward error correction decoder, a second forward error correction output data for the sample data frame, the second forward error correction output data comprises second decoded payload data, the second decoded payload data representing the payload data as corrected by the second forward error correction decoder and as decoded from the encoded data by the second forward error correction decoder;
    determining whether the first forward error correction output data matches the second forward error correction output data; and
    generating a failure indication in response to determining that the first forward error correction output data does not match the second forward error correction output data.

8. The system of claim 7, wherein is period for performing the operations is based on time or a data frame interval.

9. The system of claim 7, wherein the first forward error correction output data comprises first operation information generated by the first forward error correction decoder during decoding of the first decoded payload data from the encoded data, and the second forward error correction output data comprises second operation information generated by the second forward error correction decoder during decoding of the second decoded payload data from the encoded data.

10. A system comprising:
a first physical layer device configured to communicate data with a second physical layer device over a data transmission medium, the first physical layer device comprising:
a forward error correction decoder; and
a forward error correction decoder failure detector configured to configured to perform operations comprising:
receiving data frames generated by the second physical layer device;
determining whether a received data frame is carrying expected payload data; and
in response to determining that the received data frame is not carrying expected payload data:
causing the forward error correction decoder to process a predetermined data pattern;
receiving, from the forward error correction decoder, forward error correction output data for the predetermined data pattern;
determining whether the forward error correction output data matches an expected forward error correction output data for the predetermined data pattern; and
generating a failure indication in response to determining that the forward error correction output data does not match the expected forward error correction output data.

11. The system of claim 10, wherein the forward error correction output data for the predetermined data pattern is first forward error correction output data, and wherein the operations comprise:
in response to determining that the received data frame is carrying expected payload data:
causing the received data frame to be processed by the forward error correction decoder;
receiving, from the forward error correction decoder, second forward error correction output data for the received data frame, the second forward error correction output data comprising carried payload data that is decoded from the received data frame by the forward error correction decoder; and
outputting the carried payload data.

12. The system of claim 10, wherein the predetermined data pattern comprises one or more predetermined data frames.

13. A system comprising:
a first physical layer device configured to communicate data with a second physical layer device over a data transmission medium, the first physical layer device comprising:
a forward error correction decoder; and
a forward error correction decoder failure detector configured to receive data frames generated by the second physical layer device and configured to perform an error detection process, the error detection process comprising:
causing the second physical layer device to inject one or more errors into a designated data frame;
detecting for when the designated data frame is received by the forward error correction decoder failure detector; and in response to detecting the designated data frame:
causing the designated data frame to be processed by the forward error correction decoder;
receiving, from the forward error correction decoder, forward error correction output data for the designated data frame;
based on the forward error correction output data, determining whether the forward error correction decoder corrected the one or more errors injected into the designated data frame by the second physical layer device; and
generating a failure indication in response to determining that the forward error correction decoder failed to correct the one or more errors injected into the designated data frame by the second physical layer device.

14. The system of claim 13, wherein the forward error correction decoder failure detector performs the error detection process in response to an instruction from a higher layer component operatively coupled to the first physical layer device.

15. The system of claim 13, wherein the causing of the second physical layer device to inject the one or more errors into the designated data frame comprises:
transmitting one or more messages to the second physical layer device, at least one message of the one or more messages requesting the second physical layer device to inject the one or more errors into the designated data frame.

16. The system of claim 15, wherein the at least one message specifies a at least one of:
a number error words to be injected into the designated data frame;
a position of error words within the designated data frame;
an identifier of the designated data frame; or
a type of error word to be injected into the designated data frame.

17. The system of claim 13, wherein the one or more errors are recoverable by the forward error correction decoder failure detector without use of the forward error correction decoder, and wherein the error detection process comprises:
in response to determining that the forward error correction decoder failed to correct the one or more errors injected into the designated data frame by the second physical layer device, correcting the one or more errors without use of the forward error correction decoder by the forward error correction decoder failure detector either:
flipping bits in a data word from the data frame; or
swapping correct values between two data words in the data frame.

18. The system of claim 13, wherein the first physical layer device is configured to receive operations, administration and maintenance (OAM) messages from the second physical layer device, and wherein the detecting for when the designated data frame is received by the forward error correction decoder failure detector comprises:
monitoring a counter value included in operations, administration and maintenance (OAM) messages received from the second physical layer device, the counter value indicating a number of data frames that will be received by the first physical layer device before the designated data frame is received by the first physical layer device; and identifying an individual data frame, received from the second physical layer device, as the designated data frame in response to the counter value reaching an expected value.

\* \* \* \* \*